March 7, 1939.

P. D. LOWELL ET AL

Re. 21,023

RADIO RECEIVING APPARATUS

Original Filed March 27, 1922 2 Sheets-Sheet 1

Inventor
Percival D. Lowell.
Francis W. Dunmore.
By John B. Brady
Attorney

March 7, 1939. P. D. LOWELL ET AL Re. 21,023

RADIO RECEIVING APPARATUS

Original Filed March 27, 1922 2 Sheets-Sheet 2

Inventor

Percival D. Lowell

Francis W. Dunmore

By John B. Brady

Attorney

Reissued Mar. 7, 1939

Re. 21,023

UNITED STATES PATENT OFFICE 21,023

RADIO RECEIVING APPARATUS

Percival D. Lowell, Chevy Chase, Md., and Francis W. Dunmore, Washington, D. C.

Original No. 1,455,141, dated May 15, 1923, Serial No. 547,111, March 27, 1922. Application for reissue August 16, 1938, Serial No. 225,246

27 Claims. (Cl. 250—20)

Figure 1:
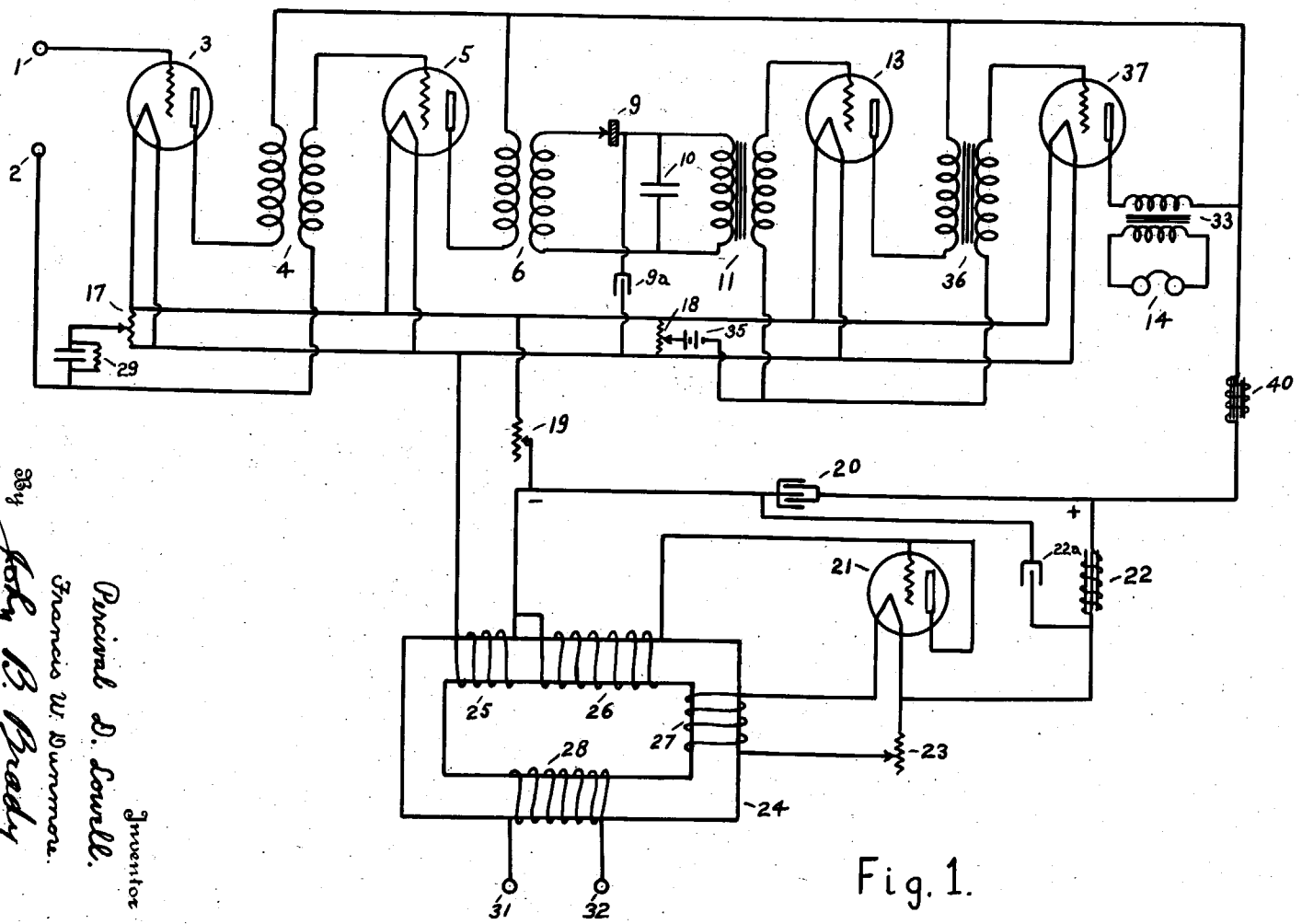

Our invention relates broadly to radio telegraph and telephone receiving apparatus and more particularly to a circuit arrangement for such receivers.

The object of the invention is to provide a receiver unit of maximum sensitivity employing thermionic vacuum tubes with their circuits supplied with energy from the standard alternating current residence lighting power.

Another object of the invention is to provide both radio and audio frequency amplification at the receiver and means for energizing the power circuits of the amplifier stages from the standard alternating current residence lighting power without interference in the reproducing receivers from the hum of the alternating current power supply.

A further object of the invention is to provide a circuit arrangement for a receiver wherein both the radio and audio frequency currents are amplified by means of electron tubes, a crystal detector used as a rectifier, the necessary filament and plate voltages being supplied by the standard alternating current residence lighting power, the residual hum in the telephone receivers being balanced out or neutralized by means of voltage dividers and other devices in the receiver circuits.

A still further object of the invention is to provide means in a radio receiver for transforming the alternating current power supply into currents suitable for the various circuits of the radio and audio frequency stages of the vacuum tube amplifiers and means for rectifying currents and obtaining a steady source of direct current potential for the plate circuits of the vacuum tubes.

Electron tube amplifiers form an important part of practically all radio receiving sets now, except the most simple types. Such amplifiers are in fact necessary to receive distant stations, or when using coil antennae. For good operation, amplifier tubes require for the filament a source of voltage of very constant value (usually about 6 volts) and for the plate a source of voltage of from 40 to perhaps 300 volts. The filament voltage is usually supplied by storage cells, and the plate voltage by dry cells. The maintenance of these cells in operating condition, especially the storage cells, is often a source of much difficulty and annoyance. The storage cells are necessarily bulky and heavy, require constant attention to maintain proper charge and density of electrolyte, give off injurious acid or other fumes, and are subject to considerable variations of voltage during the period of discharge. The development of a receiver employing an amplifier which can be supplied from the ordinary 110-volt alternating current lighting mains is of considerable practical importance, since it eliminates the great practical difficulty of maintaining storage cells. The amplifier using such alternating current supply has the important advantages of reliability, convenience, and cheapness both in first cost and operating cost.

Figure 2:
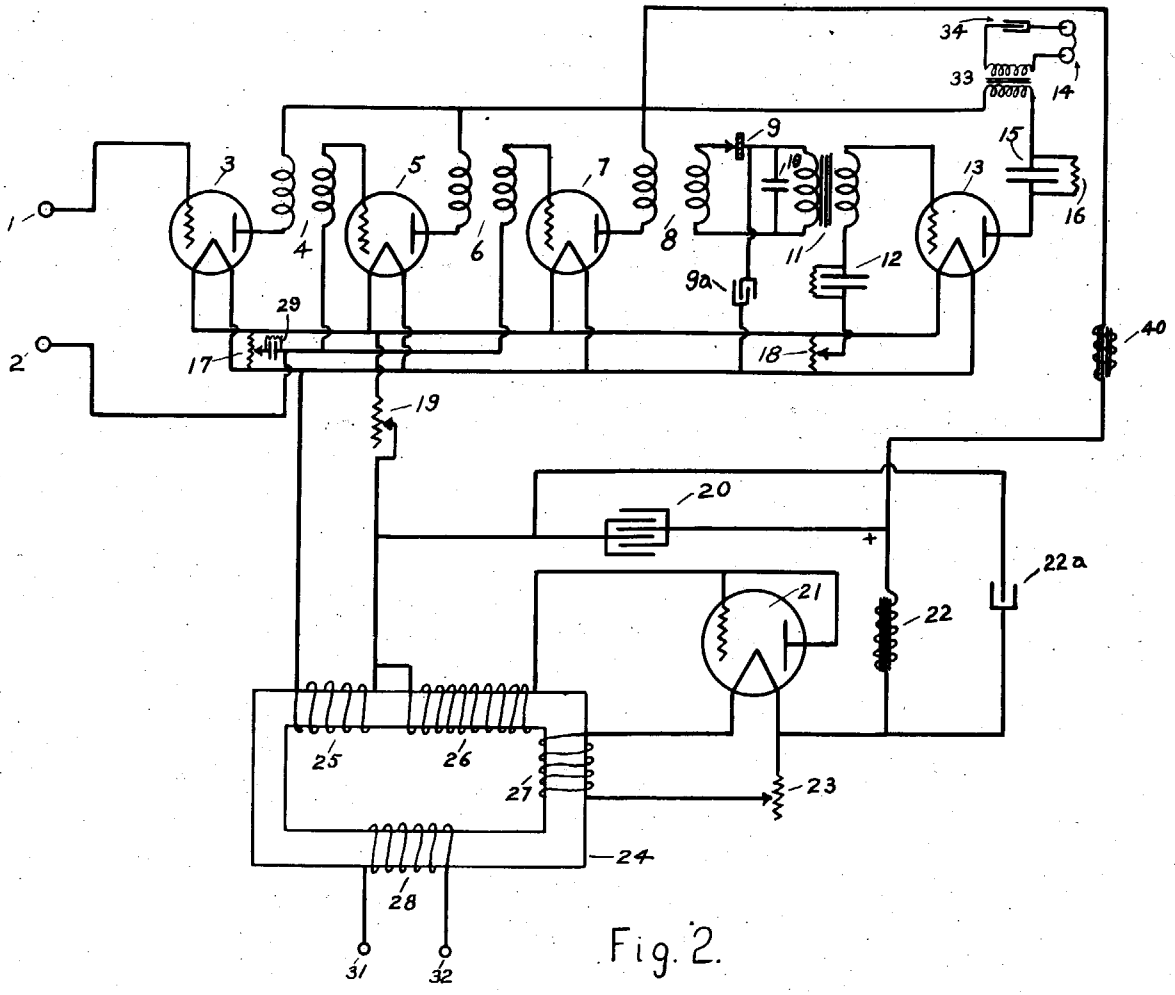

The invention will be more clearly understood by reference to the following specification and the accompanying drawings in which:

Figure 1 is a schematic wiring diagram of a complete receiver embodying two stages of radio frequency amplification, a crystal detector, and two stages of audio frequency amplification; and Fig. 2 is a wiring diagram of a modified form of our receiver including three stages of radio frequency amplification, a crystal detector, and one stage of audio frequency amplification.

It will be understood that the principles of our invention may be embodied in various forms and that details are not material. The present embodiment of the invention, therefore, is to be considered as merely indicative. The form illustrated in the drawings and hereinafter described in detail has been found to be one of the practical embodiments and capable of efficient operation and practical in construction.

The receiver of the present invention is particularly adapted for general use in receiving radio broadcasting concerts, news, lectures, music and messages. The receiver does not require the usual primary or secondary batteries as a source of power for the filament and plate circuits of the vacuum tube amplifiers. A power transformer forms a part of the apparatus and power from the standard alternating current residence lighting circuit is supplied to the primary winding of the transformer. The transformer has a plurality of secondary windings wound in such ratio as to give proportionate current and voltage values as required by the filament and plate circuits of the amplifiers. A rectifier of the two electrode valve type is employed for obtaining a direct current for the plate supply to the tubes and the filament of this valve is also supplied with heating current obtained from one of the proportionate secondary windings of the transformer. The control of the filament temperature of this valve affords means for regulating the potential supplied to the plates of the tubes.

Heretofore in the art successful results have not been obtained by employing the alternating current residence lighting circuit as a source of power supply due to the persistent and predominating interference offered in the reproducing telephones by the hum of the alternating current. We have discovered that this residual hum can be eliminated and in the present receiver the telephones are to all practical purposes absolutely silent as far as any residual hum from the alternating current power supply is concerned. To obtain this result we employ a rectifier of the crystal detector type, although other forms of rectifiers may be readily employed, interposed in circuit after the stages of radio frequency amplification and before the stages of audio frequency amplification. The use of a crystal detector is not as objectionable as it would seem on first consideration, as the radio-audio amplification in association with this form of rectifier makes possible a quick adjustment due to the fact that most any point on a sensitive crystal will bring in a signal of sufficient intensity for all practical purposes. The employment of a crystal detector in place of the electron tube detector reduced the 60-cycle hum very considerably. When an electron tube is used as the detector, there is impressed on both the plate and the filament a 60-cycle A. C. voltage which although small, becomes very objectionable when amplified by one or two stages of audio-frequency amplification. When the crystal detector is used, no 60-cycle voltage is supplied to the detector circuit. The radio-frequency transformer whose output is delivered to the detector circuit prevents the passage in any appreciable amount of 60-cycle current supplied to the radio-frequency stage and such voltages are not present in the crystal detector circuit and do not reach the input of the audio-frequency stage. In predetermined parts of the circuits of the vacuum tube amplifier voltage dividers, balancing resistances, leak resistances, condensers and choke coils are employed to balance out or neutralize any residual hum and prevents its passage into the telephone receivers.

Referring more particularly to Fig. 1 of the drawings a receiver circuit is shown adapted for connection with a variably tuned circuit and thence with an antenna ground system or with a coil antenna. The receiver illustrated comprises an amplifier circuit with two radio frequency stages, a crystal detector and two audio frequency stages. The filaments of all the tubes are connected in parallel and are lighted by alternating current voltage supplied from the secondary winding 25 of the transformer 24, their brilliancy being controlled by the rheostat 19. The primary winding of transformer 24 is shown at 28, the alternating current power supply being connected to the terminals 31 and 32.

Winding 26 of transformer 24 supplies high voltage alternating current which is rectified by the electron tube 21, smoothed out by choke coil 22 and condensers 20 and 22a, which are about 2 microfarads capacity. The choke coil 40 may be used as a voltage limiting device in the plate circuit which serves to hold the plate voltage at the proper value regardless of the brilliancy of the electrodes of rectifier tube 21. This provides a high voltage direct current which is suitable for the plates of the amplifier tubes. The filament of the rectifier tube 21 is lighted from winding 27 of transformer 24. The rheostat 23 varies the brilliancy of the rectifier filament, which in turn controls the direct current voltage output.

The input terminals to the amplifier are shown at 1 and 2, being connected to the grid of tube 3 and terminal 2 being connected to the slider of balancing resistance 17 through a grid leak and shunting condenser indicated as a unit at 29, the latter serving to keep the grids of tubes 3 and 5 at the proper operating voltage, making the tube more suitable for amplifying. In the unit 29 the condenser is about 1 microfarad capacity and the shunting resistance is about 1 megohm. The balancing resistance 17 is about 200 ohms and is connected directly across the filament line and serves to stabilize the normal grid voltage. A similar balancing resistance 18 performs a similar function for the grids of tubes 13 and 37. The slider of balancing resistance 18 is connected through a dry battery 35 to grid of tubes 13 and 37. This battery impresses a suitable negative voltage on the grids making the tubes more suitable for amplifying. As this battery furnishes grid voltage only the power consumed is negligible. It is therefore of the small flashlight battery type and will continue effective for a period equivalent to its normal shelf life.

The plate circuit of tube 3 is coupled to the grid circuit of tube 5 by means of the radio frequency transformer 4. There is some variation in the plate current of tube 3 due to the periodic variation in filament temperature but the resultant audio frequency hum does not pass through the radio frequency coupling of transformer 4 and does not reach the input of tube 5.

The secondary of radio transformer 4 is connected to grid of tube 5 and to slider of balancing resistance 17 through condenser and shunting grid leak resistance 29, the resistance 17 keeping the grid voltage steady and the condenser and shunted resistance 29 keeping the grids at the proper negative voltage for amplifying purposes.

The primary winding of radio frequency transformer 6 is connected in the plate circuit of tube 5. The secondary winding of transformer 6 is connected to the crystal detector circuit 9 and includes the primary of audio frequency transformer 11 having a radio frequency by-pass condenser 10 shunted across the winding. The end of primary winding of transformer 11 which is connected to the crystal detector 9 is also connected to the filament circuit through a suitable condenser 9a of 1 microfarad capacity, this condenser serving to further remove the 60 cycle hum from the telephone receivers. The secondary terminals of this audio transformer 11 are connected to the grid of tube 13 and to slider of balancing resistance 18 through battery 35. Another audio frequency stage is added in a similar manner and is indicated by transformer 36 and tube 37. The telephone receivers 14 may be connected inductively to the plate circuit of tube 37 by means of telephone transformer 33 which has a one to one ratio of windings.

By adjusting the balancing rheostats 17 and 18 the voltage of all the grids may be kept at a steady value and the battery 35 provides the proper negative voltage to the grids of the audio amplifying tubes for the best amplification, while grid leak and condenser 29 serve to keep the grids of tubes 3 and 5 at the best operating voltage.

Fig. 2 shows a modified form of circuit comprising three stages of radio frequency amplification, a crystal detector, and one stage of audio frequency amplification. As in the former case the slider of balancing resistance 17 is connected through a condenser shunted by a leak resistance 29 to the grids of the radio frequency amplifying tubes. The capacity of this condenser is about one microfarad. With this condenser in the circuit as shown, the grids assume a normal voltage suitable for amplifying as derived from winding 25 of transformer 24 while the balancing resistance 17 neutralizes effect of the alternating current on the filaments. The leak resistance across condenser 29 permits any super-charge on the grids to leak off to the filaments. This connection of condenser, high resistance leak and rheostat forms one of the neutralizing means for eliminating the hum of the alternating current from the reproducing telephone receivers.

The grid circuit of the audio frequency amplifier tube 13 is connected to the slider of balancing resistance 18 through condenser and shunted leak 12, which replaces the grid battery 35 used in the former circuit. The condenser 12 is about .02 microfarad capacity.

The purpose of the condenser 12 is to allow the grid of tube 13 to assume a normal voltage suitable for amplifying while the balancing resistance 18 serves to keep the grid voltage steady with respect to the filaments. This forms another of the means for eliminating the alternating current hum from the reproducing telephone receivers.

In series with the plate circuit of tube 13 is a condenser 15 of about .02 microfarad capacity shunted by resistance 16 of about 80,000 ohms. The action of this condenser and resistance is to partially block the low frequency fluctuations in plate current, caused by the periodic change in filament temperature, while the higher frequencies pass through more easily. The 80,000 ohms resistance allows the high voltage direct current to flow to the plate. In the secondary circuit of the telephone transformer 33 and in series with the telephone receivers 14 is shown a condenser 34 of about .02 microfarad capacity which partially blocks any low frequency hum from flowing into the telephone circuit, but which allows the higher frequencies to pass through more easily. The source of filament current and plate voltage is obtained from transformer 24 and two electrode tube rectifier 21 in the manner as described in the circuit arrangement of Fig. 1.

In either of these circuits, instead of the balancing resistance across the filament line, a divided condenser circuit with suitable grid leaks shunted across the condensers may be provided and a connection taken from the center thereof to the grid circuit, or the filament current winding on the transformer may be tapped at its electrical center and lead to the grid circuit. By provision of these neutralizers and the crystal detector rectifier the operator wearing head telephone receivers 14 has no practical interference from the low frequency hum of the alternating current power supply.

The amplifier as above described is adapted to be mounted in a readily portable cabinet which may also contain suitable variable tuning apparatus and the coil aerial, thus making a complete compact, portable, and practical receiving unit. The power transformer is provided with a flexible cord lead and this may be plugged in to a source of standard house lighting current such as 110 volts 60 cycles A. C. The filaments of the tubes are brought up to an electron emitting temperature by rheostat 19. The plate potential is regulated by varying the temperature of the filament of the rectifier tube 21 by varying the rheostat 23. Rheostats 17 and 18 are regulated to adjust the grid potential and secure neutralization of any disturbing interference from low frequency hum. The crystal detector is adjusted to maximum sensitivity and the radio telephone or telegraph signals reproduced in telephone receivers 14.

The tubes in the signal receiving circuit have the cathode, grid and plate circuits thereof all energized from the alternating current source, but by reason of the coaction of the several hum eliminating means and the steady potential on the grid electrodes derived from the alternating current source, the hum of the alternating current in the output circuit is substantially negligible.

While we have described our invention in certain specific embodiments, it will be understood that modifications may be made and that no limitations upon the invention are intended beyond the scope of the appended claims.

What we claim is:

1. In an apparatus for receiving radio signals the combination of a source of signal energy, means for amplifying said energy comprising an electron tube which includes a control grid, a cathode and a plate electrode, a cathode heating circuit, means for rectifying said energy, a source of alternating current for supplying alternating current to the cathode heating circuit and rectified current to the plate electrode of said electron tube, means for deriving potential for said control grid from said source of alternating current and a plurality of means in circuit with said amplifying means for eliminating the hum of said alternating current in said apparatus comprising a connection from the control grid of said electron tube to the cathode thereof at a point not subjected to the influence of variations of cathode heating current, elements connected with the amplifying means for transferring signaling energy while substantially preventing the passage of power supply frequencies, and a resistor shunted by a condenser interposed in the circuit between the control grid and the cathode of the electron tube where the condenser forms a low impedance path for both signal and power supply frequencies and wherein the voltage drop across said resistor provides a negative bias for the control grid of the electron tube.

2. In an apparatus for the reception of radio signals the combination of a source of signal energy, means for amplifying said signals, comprising an electron tube which includes a control grid, a cathode, and a plate electrode, a cathode heating circuit, means for rectifying said signals, a source of alternating current for supplying alternating current to the cathode heating circuit and rectified current to the plate electrode of said electron tube, means for deriving potential for said control grid from said source of alternating current, and means connected to said amplifying and rectifying means for eliminating the hum of said alternating current in said apparatus comprising a connection from the control grid of the electron tube to the cathode thereof at a point not subjected to the influence of variations of cathode heating current, elements connected with the amplifying means and between said amplifying and rectifying means for transferring signal frequencies while substantially preventing the passage of power supply frequencies, and a resistor shunted by a condenser interposed between the grid and the cathode of the amplifying means, where said condenser forms a low impedance path for both signal and power supply frequencies and wherein the voltage drop across said resistor provides a negative bias for the grid of the amplifying means.

3. In an apparatus for the reception of radio signals the combination of a source of signal energy, means for amplifying said signal energy at radio frequencies, comprising an electron tube which includes a control grid, a cathode, and a plate electrode, a cathode heating circuit, means for rectifying said energy, means for amplifying said energy at audio frequencies, comprising an electron tube which includes a control grid circuit, a source of alternating current for supplying alternating current to the cathode heating circuit and rectified current to the plate electrode of said electron tube, means for deriving potential for each of said control grid circuits from said source of alternating current and separate means connected to each of said amplifying and rectifying means for eliminating the hum of said alternating current in said apparatus, comprising a connection from the grid of the amplifying means to the cathode thereof at a point not subjected to the influence of variations of the cathode heating current, and elements connected between the means for amplifying said signal energy at radio frequencies and the means for rectifying said energy for transferring signal energy while substantially preventing the passage of power supply frequencies.

4. In an apparatus for the reception of radio signals the combination of a source of signal energy, means for amplifying said energy at radio frequencies, comprising an electron tube which includes a control grid, a cathode, and a plate electrode, a cathode heating circuit, means for rectifying said energy, means for amplifying said energy at audio frequencies, comprising an electron tube which includes a control grid circuit, a reproducer connected to said last amplifying means, a source of alternating current for supplying alternating current to the cathode heating circuit and rectified current to the plate electrode of said electron tube, separate means for deriving a steady potential from said source of alternating current for each of said control grid circuits, and means connected to each of said amplifying, rectifying and reproducing means for eliminating the hum of the alternating current in said apparatus comprising a connection from the grid of the amplifying means to the cathode thereof at a point not subjected to the influence of variations of the cathode heating current, and elements connected with the amplifying means and between the amplifying means and the rectifying means for transferring signal energy while substantially preventing the passage of power supply frequencies.

5. In an apparatus for the reception of radio signals the combination of a source of signal energy, a plurality of vacuum tubes arranged to amplify said energy at radio frequencies, a crystal detector arranged to rectify said energy, means for amplifying and reproducing said energy at audio frequencies, a source of alternating current for supplying power to said amplifying means, and a plurality of means for eliminating the hum of said alternating current in said apparatus.

6. In an apparatus for the reception of radio signals the combination of a source of signal energy, a plurality of vacuum tubes having grid, filament and plate electrodes, circuits interconnecting said electrodes whereby said tubes amplify said signal energy at radio frequencies, a crystal detector for rectifying said energy, means for amplifying and reproducing said energy at audio frequencies, a source of alternating current for supplying power to said amplifying means, and means in each of said circuits for eliminating the hum of the alternating current in said apparatus.

7. In an apparatus for the reception of radio signals the combination of a source of signal energy, means for amplifying said energy at radio frequencies, comprising an electron tube which includes a control grid, a cathode, and a plate electrode, a cathode heating circuit, means for rectifying said energy, means for amplifying and reproducing said energy at audio frequencies, said last mentioned amplifying means including an electron tube having a control grid, a cathode, and a plate electrode, a cathode heating circuit, a source of alternating current, means for rectifying said current and supplying the rectified power to the circuits of said amplifying means. separate means in different parts of said circuits for eliminating the hum of the alternating current in said apparatus, which comprises a connection from the grids of said amplifying means to the cathodes thereof at a point not subjected to the influence of variations of the cathode heating current, elements connected with the means for amplifying said energy at radio frequencies and elements interconnecting the means for amplifying said energy at radio frequencies with the means for rectifying said energy which transfer signal frequencies while substantially preventing the passage of alternating current hum, and a resistor shunted by a condenser connected in a circuit between the grid and cathode of the electron tube which amplifies the signal energy at radio frequencies, where the said condenser forms a low impedance path for both signal and power supply frequencies, and means for deriving potential for each of said control grid circuits from said source of alternating current.

8. In an apparatus for the reception of radio signals the combination of a source of signal energy, a radio frequency vacuum tube amplifier, a crystal detector, an audio frequency vacuum tube amplifier, circuits connecting said amplifiers with said crystal detector, a source of alternating current for supplying power to said amplifiers, and separate means in each of said circuits for eliminating the hum of the alternating current in said apparatus.

9. In an apparatus for the reception of radio signals the combination of a source of signal energy, a radio frequency vacuum tube amplifier, a crystal detector, an audio frequency vacuum tube amplifier, circuits connecting said amplifiers with said crystal detector, a source of alternating current for supplying power to said amplifiers, adjustable means in said amplifier circuits and fixed means connected to said detector circuit for eliminating the hum of said alternating current in said apparatus.

10. In an apparatus for the reception of radio signals the combination of a source of signal energy, a radio frequency vacuum tube amplifier, a crystal detector, an audio frequency vacuum tube amplifier means for reproducing the signal energy, circuits connecting said amplifiers with said crystal detector, a source of alternating current for supplying power to said amplifiers, condensers shunted by resistances connected in said amplifier circuits, and adjustable means for eliminating the hum of said alternating current in said reproducing means.

11. In an apparatus for the reception of radio signals the combination of a source of signal energy, a radio frequency vacuum tube amplifier, a crystal detector, an audio frequency vacuum tube amplifier, a reproducer connected to said audio frequency amplifier, a transformer having a primary winding and a plurality of secondary windings, a source of alternating current connected to said primary winding, said secondary windings being connected to supply power to the circuits of said vacuum tube amplifiers, and hum eliminators connected in different portions of said circuits.

12. In an apparatus for the reception of radio signals the combination of a source of signal energy, a radio frequency vacuum tube amplifier, a crystal detector, an audio frequency vacuum tube amplifier, a reproducer connected to said audio frequency amplifier, a transformer having a primary winding and a plurality of secondary windings, a source of alternating current connected to said primary winding, said secondary windings being connected to supply power to the circuits of said vacuum tube amplifiers, and separate means connected in each of the circuits of said amplifiers, detector and reproducer for eliminating the hum of said alternating current in said apparatus.

13. In an apparatus for the reception of radio signals the combination of a source of signal energy, a radio frequency vacuum tube amplifier, which includes a control grid, a cathode, and a plate electrode, a cathode heating circuit, a detector, an audio frequency vacuum tube amplifier, having a control grid circuit, a reproducer connected to said audio frequency amplifier, a transformer having a primary winding and a plurality of secondary windings, a source of alternating current connected to said primary winding, means for supplying alternating current to said cathode heating circuit, means for rectifying energy from one of said secondary windings, means for supplying the rectified energy to the circuits of said vacuum tube amplifiers, separate means connected in each of the circuits of said amplifiers, detector and reproducer for eliminating the hum of said alternating current in said apparatus, comprising a connection from the grids of the amplifiers to the cathodes thereof at a point not subjected to the influence of variations of the cathode heating current, elements connected with said radio frequency vacuum tube amplifier and interconnecting the output of said radio frequency vacuum tube amplifier with the detector for transferring signal energy while substantially preventing the passage of power supply frequencies, and a resistor shunted by a condenser and connected in the circuit between the grid and cathode of each of said amplifiers, where the said condenser forms a low impedance path for both signal and power supply frequencies, and means for deriving a bias potential for each of said control grid circuits from said source of alternating current.

14. In an apparatus for the reception of radio signals the combination of a source of signal energy, a plurality of vacuum tubes having grid, cathode and plate electrodes, circuits interconnecting said electrodes whereby said tubes amplify said signal energy at radio frequencies, a detector for rectifying said energy, vacuum tubes having grid, cathode and plate electrodes for amplifying said energy at audio frequencies, a source of alternating current, means for rectifying said current and supplying potential to the plate circuits of said tubes, means for deriving from said source of alternating current a substantially steady potential for said grid electrodes, and separate means in each of said circuits for eliminating the hum of the alternating current in said apparatus comprising a connection from the grids of the vacuum tubes to the cathodes thereof at a point not subjected to the influence of variations of the cathode heating current, and elements interconnecting the plurality of vacuum tubes which amplify the signal energy at radio frequencies for transferring signal energy while substantially preventing the passage of power supply frequencies.

15. In an apparatus for the reception of radio signals the combination of a source of signal energy, a plurality of vacuum tubes having grid, cathode and plate electrodes, a cathode heating circuit, a detector, circuits interconnecting said electrodes and said detector, said circuits including an inductively coupled radio frequency transformer, a power transformer having a primary winding connected to a source of alternating current, secondary windings, a rectifier having a cathode and a plate, connections between one of said secondary windings and the cathode of said rectifier, connections between another of said secondary windings in a series path between the cathode and plate of said rectifier whereby direct current is supplied to the plate circuits of said vacuum tubes, another of said secondary windings connected to supply heating current to the cathodes of said vacuum tubes and a capacity and resistance connected in circuit with said grid electrodes, said vacuum tubes having the grid electrodes thereof connected with the cathodes thereof at a point not subjected to the influence of variations of the cathode heating current.

16. In an apparatus for receiving radio signals the combination of a source of signal energy, means for amplifying said energy comprising an electron tube which includes a control grid, a cathode and a plate electrode, a cathode heating circuit, means for rectifying said energy, a source of alternating current for supplying alternating current to said cathode heating circuit and rectified current to said plate electrode, means for rectifying said current, a plurality of separate means connected in circuit with said rectifying means for smoothing out the rectified current and supplying power to said amplifying means, while substantially preventing distortion of the signal current, and means for deriving a substantially steady potential for said control grid circuit from said source of alternating current.

17. In an apparatus for the reception of radio signals the combination of a source of signal energy, a plurality of vacuum tubes having grid, filament and plate electrodes, a source of alternating current for supplying power to said tubes, a detector for rectifying said signal energy, circuits interconnecting said electrodes and said detector, and an unipolar connection including a condenser between the circuit containing said detector and said filament electrodes, and means in said circuits for eliminating the hum of the alternating current in said apparatus.

18. In an apparatus for the reception of radio signals the combination of a source of signal energy, a plurality of vacuum tubes having grid, cathode and plate electrodes, a grid circuit, a cathode heating circuit, and a plate circuit connected with the respective electrodes, a detector, circuits interconnecting said circuits and said detector, including a radio frequency transformer, a source of alternating current for supplying alternating current to the cathode heating circuit and rectified current to the plate electrodes of said vacuum tubes, and means connected in circuit with said grid electrodes for eliminating the hum of the alternating current in said apparatus, comprising a connection from the grids of the vacuum tubes to the cathodes thereof at a point not subjected to the influence of variations of the cathode heating current, and filter elements in the plate circuit to reduce fluctuation in power supply frequencies, and a resistor energized from said source of alternating current for producing a substantially steady potential on said grid electrodes.

19. In an apparatus for the reception of radio signals the combination of a source of signal energy, a plurality of vacuum tubes having grid, cathode and plate electrodes, a cathode heating circuit, a detector, circuits interconnecting said electrodes and said detector, a source of alternating current, for supplying alternating current to said cathode heating circuit, means disposed in the circuits interconnecting said electrodes and said detector for transferring signal energy while substantially preventing the passage of power supply frequencies, a two electrode valve for rectifying said current and supplying the rectified energy to the plate electrodes of said vacuum tubes, and means connected in circuit with said grid electrodes for deriving a potential from said source of alternating current for stabilizing the potential of said grid electrodes and preventing influence of the fluctuation of said source of alternating current thereon.

20. In an apparatus for receiving radio signals the combination of a source of signal energy, means for amplifying said energy, comprising electron tubes, each having a control grid, a cathode and a plate electrode, a cathode heating circuit, means for rectifying said energy, means for reproducing said energy, a source of alternating current for supplying alternating current to the cathode heating circuit and rectified current to the plate electrodes of said electron tubes, means for deriving from said source of alternating current a substantially steady potential for the control grid circuit, and means connected in circuit with said reproducing means for eliminating the hum of said alternating current in the reproducing means.

21. In an apparatus for the reception of radio signals the combination of a source of signal energy, a plurality of vacuum tubes having grid, cathode and plate electrodes, a cathode heating circuit connected with the cathodes of said tubes, a source of alternating current for supplying alternating current to the cathode heating circuit and rectified current to the plate electrodes of said tubes, a detector for rectifying said signal energy, circuits interconnecting said electrodes and said detector, means in circuit with said grid electrodes comprising a resistor shunted by a condenser, and means for producing a potential across said resistor from said source of alternating current for impressing a steady potential upon said grid electrodes.

22. In a signal receiving system, a multiplicity of electron tubes, each including a cathode, a control grid and a plate electrode, circuits interconnecting said electron tubes for successively acting upon incoming signaling energy, a power source of alternating current, means for rectifying said current and supplying the rectified energy to said plate electrodes, means for deriving from said source of alternating current a substantially steady potential for each of said control grid electrodes, and means coupling the circuits of said successively acting electron tubes which substantially prevent the passage of the hum of the alternating current power source while transferring the signaling energy from tube to tube.

23. In a signal receiving system, an electron tube having a cathode, a control grid and a plate electrode, a power source of alternating current, means for rectifying said current and energizing said plate electrode therefrom, and means in circuit with said grid electrode for deriving from said power source of alternating current, a substantially steady potential for preventing fluctuations of said alternating current from impairing the operation of said control grid upon receipt of a signal, a detector connected with said electron tube, means coupling said tube with said detector for transferring signaling energy while substantially preventing the passage of hum of the alternating current power source, and an observing device connected with said detector and operating substantially without interference from the hum of the alternating current from said power source.

24. In a signal receiving system, an electron tube having a cathode, a control grid and a plate electrode, a power source of alternating current, means for rectifying said current and energizing said plate electrode therefrom, and a resistor in circuit with said grid electrode for deriving from said power source of alternating current, a substantially steady potential for preventing fluctuations of said alternating current from impairing the operation of said control grid upon receipt of a signal, a detector connected with said electron tube, means coupling said tube with said detector for transferring signaling energy while substantially preventing the passage of hum of the alternating current power source, and an observing device connected with said detector and operating substantially without interference from the hum of the alternating current from said power source.

25. In a signal receiving system, an electron tube having a cathode, a control grid and a plate electrode, a power source of alternating current, means for rectifying said current and energizing said plate electrode therefrom, and a resistor shunted by a condenser in circuit with said grid electrode for deriving from said power source of alternating current, a substantially steady potential for preventing fluctuations of said alternating current from impairing the operation of said control grid upon receipt of a signal, a detector connected with said electron tube, means coupling said tube with said detector for transferring signaling energy while substantially preventing the passage of hum of the alternating current power source, and an observing device connected with said detector and operating substantially without interference from the hum of the alternatnig current from said power source.

26. In a signal receiving system, an electron tube having a cathode, a control grid, and a plate electrode, a cathode heating circuit, a control grid circuit, and a plate circuit, a power source of alternating current, means for rectifying said current and energizing said plate electrode therefrom, means for supplying alternating current to said cathode heating circuit, means connected with said plate circuit and operating to derive power from said source of alternating current, a resistor connected with said last mentioned means and connected in circuit with said control grid circuit for impressing a bias potential upon said control grid, a detector, means coupling said plate circuit with said detector for transferring signaling energy from said plate circuit to said detector while substantially preventing the passage of power supply frequencies independently of signal modulation, and an observing device connected with said detector and operating substantially without interference from the hum of the alternating current from said power source.

27. In a signal receiving system, an electron tube having a cathode, a control grid and a plate electrode, a cathode heating circuit, a control grid circuit and a plate circuit, a power source of alternating current, means for rectifying said current and energizing said cathode heating circuit from said power source of alternating current while maintaining said control grid substantially free of effects of alternating current hum, means connected with said plate circuit and operating to derive power from said alternating current power source, a resistor connected with said means and connected with said control grid circuit for impressing bias potential upon said control grid, a condenser connected in shunt with said resistor, a detector, means coupling said plate circuit with said detector for transferring signaling energy while substantially preventing the passage of hum of the alternating current power source independently of signal modulation, and an observing device connected with said detector and operating substantially without interference from the hum of the alternating current from said power source.

PERCIVAL D. LOWELL.
FRANCIS W. DUNMORE.